US011825036B2

(12) United States Patent
Oki

(10) Patent No.: US 11,825,036 B2
(45) Date of Patent: Nov. 21, 2023

(54) IMAGE INSPECTION DEVICE, COMPUTER-READABLE RECORDING MEDIUM STORING A PROGRAM, AND IMAGE FORMING DEVICE

(71) Applicant: Konica Minolta, Inc., Tokyo (JP)

(72) Inventor: Makoto Oki, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/451,637

(22) Filed: Jun. 25, 2019

(65) Prior Publication Data

US 2020/0028976 A1    Jan. 23, 2020

(30) Foreign Application Priority Data

Jul. 19, 2018    (JP) .................................. 2018-136028

(51) Int. Cl.
*H04N 1/00*     (2006.01)
*G03G 15/22*    (2006.01)

(52) U.S. Cl.
CPC ....... *H04N 1/00005* (2013.01); *G03G 15/221* (2013.01); *H04N 1/00013* (2013.01); *H04N 1/00074* (2013.01); *H04N 1/00084* (2013.01)

(58) Field of Classification Search
CPC ........... H04N 1/00005; H04N 1/00084; H04N 1/00013; H04N 1/00074; G06F 3/1208; G06F 3/1259; G06F 3/1285; G03G 15/221
See application file for complete search history.

(56) References Cited

U.S. PATENT DOCUMENTS

| | | | |
|---|---|---|---|
| 8,233,693 B1* | 7/2012 | DiFrancesco | G06T 7/001 382/141 |
| 2009/0175504 A1* | 7/2009 | Koarai | H04N 1/3878 382/112 |
| 2010/0033743 A1* | 2/2010 | Hirai | H04N 1/00002 358/1.9 |
| 2014/0270397 A1* | 9/2014 | Sochi | G06T 7/001 382/112 |
| 2016/0142560 A1* | 5/2016 | Shijoh | H04N 1/00005 358/1.14 |

(Continued)

FOREIGN PATENT DOCUMENTS

| | | |
|---|---|---|
| EP | 2575349 A1 | 4/2013 |
| JP | 2009-230047 A | 10/2009 |
| JP | 201042521 A | 2/2010 |

(Continued)

OTHER PUBLICATIONS

Extended European Search Report issued in corresponding European Patent Application 19187384.3 dated Dec. 13, 2019 (10 pages).

(Continued)

*Primary Examiner* — Benjamin O Dulaney
(74) *Attorney, Agent, or Firm* — Osha Bergman Watanabe & Burton LLP

(57) ABSTRACT

An image inspection device includes a processor coupled to a sensor. The processor reads, using the sensor, an image formed on a recording material by an image forming device and creates a read image; causes an analysis to detect an abnormality in the read image and creates an analysis result; and creates a normal image file including the read image in which the abnormality has not been detected based on the analysis result.

11 Claims, 13 Drawing Sheets

(56) References Cited

U.S. PATENT DOCUMENTS

2016/0231964 A1\* 8/2016 Oki ..................... H04N 1/047
2018/0086049 A1\* 3/2018 Ueshima ................ B41J 2/2139

FOREIGN PATENT DOCUMENTS

| JP | 2013-072846 A | 4/2013 |
| JP | 2014199244 A | 10/2014 |
| JP | 2015227009 A | 12/2015 |
| JP | 2016-001415 A | 1/2016 |
| JP | 2016182758 A | 10/2016 |
| JP | 2017191979 A | 10/2017 |
| JP | 2018-030254 A | 3/2018 |

OTHER PUBLICATIONS

Office Action issued in the counterpart Japanese Patent Application No. 2018-136028, dated Aug. 10, 2021 (26 bages).
Notification of Reasons for Refusal issued in the counterpart Japanese Patent Application No. 2021-182354, dated Jan. 25, 2022 (22 pages).
Office Action issued in the counterpart Japanese Patent Application No. 2021-182354, dated Dec. 21, 2021 (27 pages).
Decision to Dismiss the Amendment issued in the counterpart Japanese Patent Application No. 2021-182354, dated Mar. 8, 2022 (21 pages).

\* cited by examiner

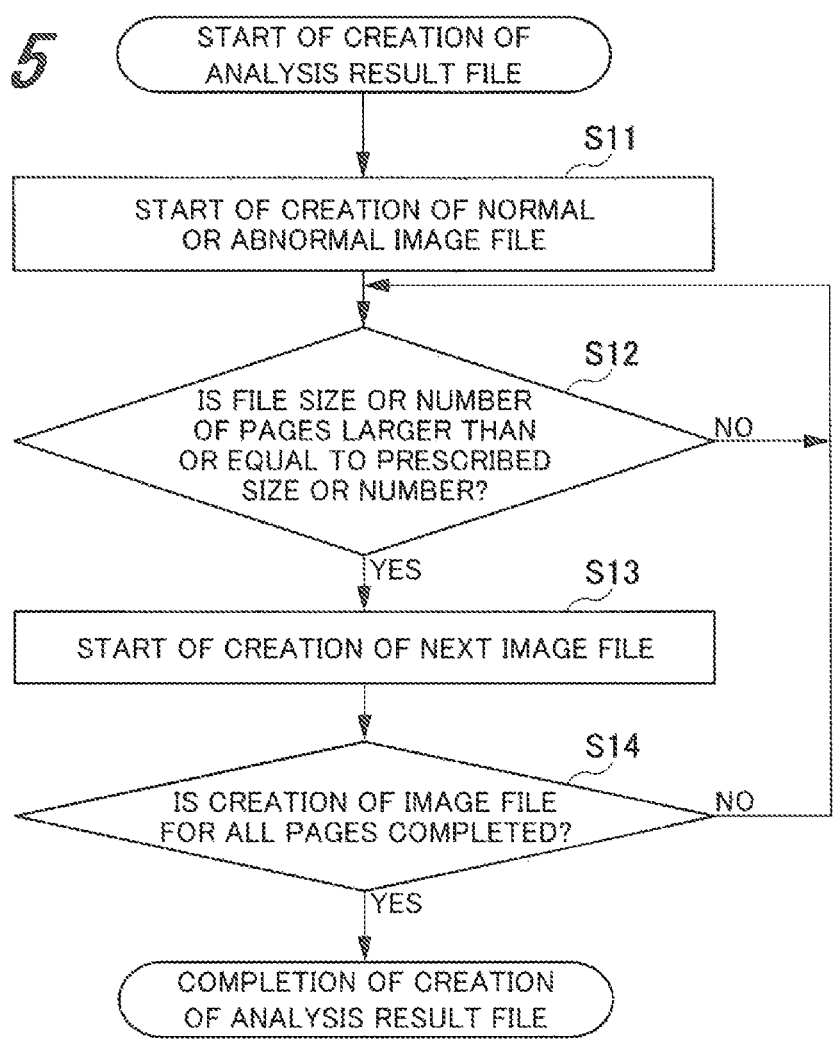

FIG. 6

136-235(Total235) / Previous

| | No. | DATE AND TIME OF INSPECTION | FILENAME | ABNORMALITY TYPE | CREATED | LINK TO REPORT PAGE |
|---|---|---|---|---|---|---|
| ☐ | 9459 | 2018/06/26 16:56:33 | catalog_jp.pdf | Stain | Created | REPORT PAGE |
| ☐ | 9458 | 2018/06/26 16:45:35 | hansoku.pdf | Stain | Created | REPORT PAGE |
| ☐ | 9457 | 2018/06/26 16:39:46 | catalog_jp.pdf | Stain Image missing | Created | REPORT PAGE |
| ☐ | 9456 | 2018/06/26 16:34:29 | hansoku.pdf | Stain | Created | REPORT PAGE |
| ☐ | 9455 | 2018/06/26 16:29:13 | catalog_jp.pdf | Stain Image missing | Created | REPORT PAGE |
| ☐ | 9454 | 2018/06/26 16:22:07 | hansoku.pdf | Stain Image missing | Created | REPORT PAGE |
| ☐ | 9453 | 2018/06/26 16:16:32 | catalog_jp.pdf | Stain | Created | REPORT PAGE |

FIG. 7

ANALYSIS RESULT REPORT

| | |
|---|---|
| [DATE AND TIME OF INSPECTION] | JUNE 26, 2018 |
| [MODEL] | PRINTING DEVICE A |
| [SERIAL NO.] | AA00000XX |
| [JOB NAME] | AA INC. NAME CARD_A4.pdf |
| [JOB SETTINGS] | TOTAL NUMBER OF COPIES 500 |
| | TOTAL NUMBER OF PAGES 2 |
| | TOTAL NUMBER OF SHEETS 500 |
| [TOTAL NUMBER OF ABNORMAL PAGES] | 3 |
| [ABNORMALITY] | SWITCH ON |
| | LEVEL LEVEL 3 |

[ABNORMAL PAGE] [NORMAL PAGE]

FIG. 9

IMAGE INSPECTION DEVICE, COMPUTER-READABLE RECORDING MEDIUM STORING A PROGRAM, AND IMAGE FORMING DEVICE

CROSS-REFERENCE TO RELATED APPLICATIONS

The entire disclosure of Japanese Patent Application No. 2018-136028, filed on Jul. 19, 2018, is incorporated herein by reference in its entirety.

BACKGROUND

Technological Field

The present invention relates to an image inspection device, a computer-readable recording medium storing a program, and an image forming device.

Description of Related Art

In the past, image inspection has been conducted in which an image printed on paper is scanned and the scanned image is analyzed to detect an abnormality in the image. In this image inspection method, if the difference of an actual printed image from what a printed image is supposed to be is not less than a prescribed value, the image can be detected as an abnormal image. Consequently, an image abnormality in the actual printed image, such as stain or a color registration error, is detected. In this method, a scanned image that shows, in an easy-to-understand manner, which part of the actual printed image has been detected as abnormal is presented as a report.

For example, Patent Literature 1 discloses a technique which delivers transfer paper with an image determined as defective and transfer paper with an image determined as normal to different delivery trays.

PATENT LITERATURE

Patent Literature 1: JP-A-2010-42521

Transfer paper sheets with a normal image which have been conveyed to the paper delivery tray using the technique disclosed in Patent Literature 1 are delivered as deliverables to the customer. However, in some cases, after the user of the image forming device took the deliverables out from the paper delivery tray, some of the deliverables were missing or the deliverables in transit were stained.

Formerly, a report submitted to the user has been made in order to show the user an abnormal spot in the scanned image clearly. However, since the report does not contain information managed as evidence related to production of printed matter, it cannot serve as evidence that a normal image has been formed on paper.

SUMMARY

One or more embodiments of the present invention provide evidence related to production of printed matter.

According to one or more embodiments of the present invention, an image inspection device comprises: a reader which reads an image formed on a recording material by an image forming device and creates a read image; a read image analyzer which makes an analysis to detect an abnormality in the read image and creates an analysis result; and a file creator which creates a normal image file containing the read image in which the abnormality has not been detected.

According to one or more embodiments of the image inspection device, a computer-readable recording medium storing a program and an image forming device are configured in the same manner as the image inspection device.

BRIEF DESCRIPTION OF THE DRAWINGS

The advantages and features provided by embodiments of the invention will become more fully understood from the detailed description given hereinbelow and the appended drawings which are given by way of illustration only, and thus are not intended as a definition of the limits of the present invention:

FIG. 5 is a flowchart which shows an example of the process to limit the amount of each image file according to one or more embodiments of the present invention;

FIG. 6 is an explanatory drawing which shows a display example of a file list screen according to one or more embodiments of the present invention;

FIG. 7 is an explanatory drawing which shows a display example of an analysis result report according to one or more embodiments of the present invention;

FIG. 9 is an explanatory drawing which shows a display example of normal pages according to one or more embodiments of the present invention;

DETAILED DESCRIPTION

Hereinafter, embodiments of the present invention will be described with reference to the drawings. However, the scope of the invention is not limited to the disclosed embodiments. In the specification and the appended drawings, the constituent elements which have substantially the same functions or structures are designated by the same reference signs and repeated description thereof is omitted.

Configuration of the Image Forming System

First, an example of the image forming system according to one or more embodiments of the present invention will be described referring to FIG. 1.

Figure 1:
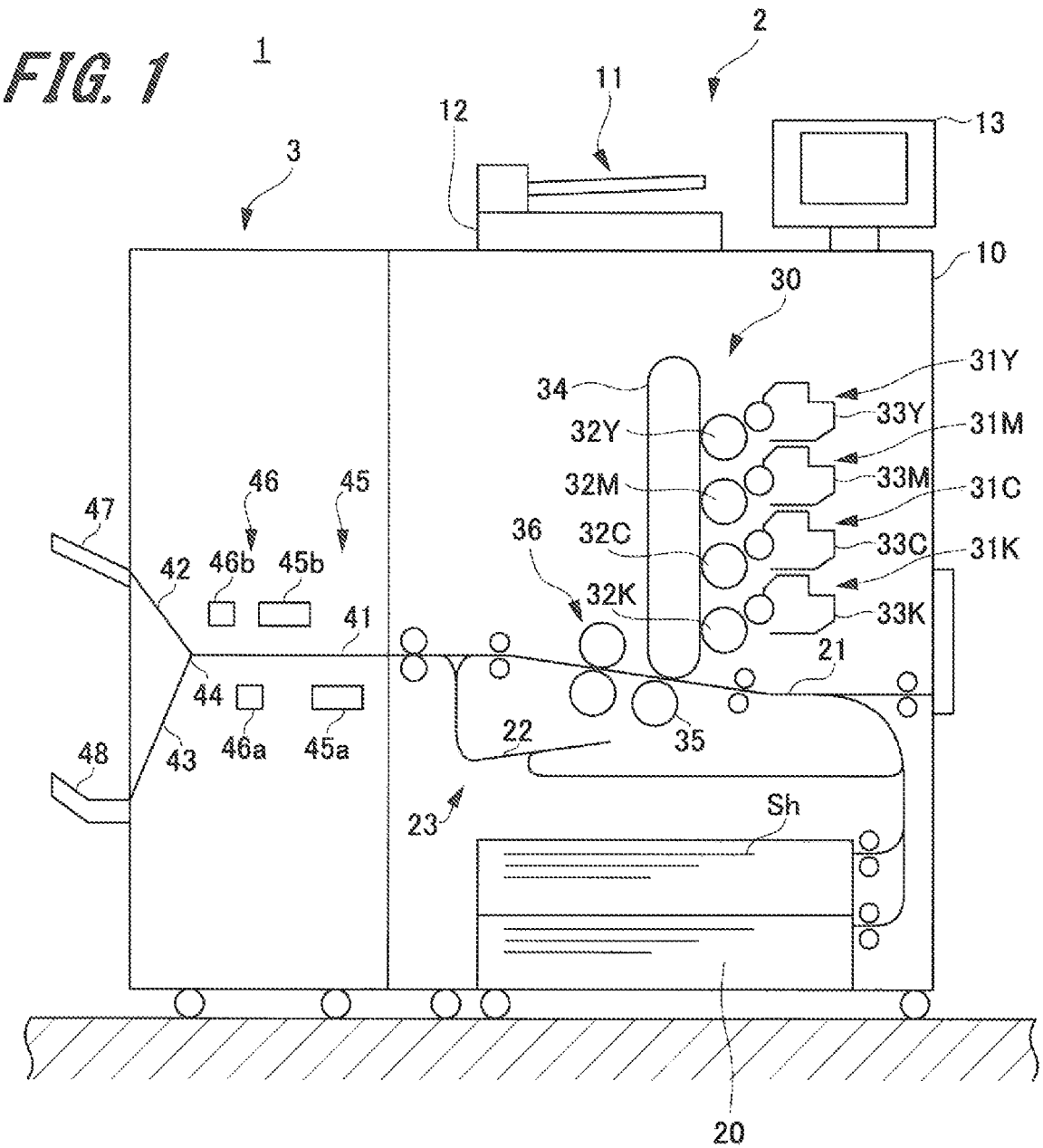
FIG. 1 is a general configuration diagram of an image forming system according to one or more embodiments of the present invention.

FIG. 1 is a general configuration diagram of an image forming system 1 according to one or more embodiments of the present invention. FIG. 1 shows the elements considered as required to explain one or more embodiments of the present invention or related elements thereto and the image forming system according to the present invention is not limited to the example shown in FIG. 1.

The image forming system 1 includes an image forming device 2 and an image inspection device 3. The image forming device 2 is an example of an image forming device which forms an image on paper by an electrophotographic method using static electricity to form an image. The image forming device 2 adopts a tandem method in which toner images of four colors, for example, yellow (Y), magenta (M), cyan (C), and black (K), are overlapped to form a color image on paper. The image forming device 2 is connected to a PC 70 (see FIG. 2 which will be described later) operated by the user, or the like through a LAN (Local Area Network) (not shown). A job is input into the image forming device 2 from the PC 70 through the LAN. The image forming device 2 performs various processes such as an image forming process according to the input job.

The image inspection device 3 inspects the image formed (printed) on a sheet Sh conveyed from the image forming device 2 to check whether it is normal or abnormal. The sheet Sh conveyed to the image inspection device 3 is a printed matter with an image formed on both sides or one side. The image inspection device 3 reads the images (or image) formed on both sides (or one side) of the sheet Sh by the image forming device 2 and makes an inspection in a prescribed manner. The sheet Sh is an example of a recording material. The image forming device 2 can also form an image on a resin sheet as an example of a recording material.

For example, if the image formed on the sheet Sh has no stain, streaks or the like, the image inspection device 3 determines that the image is normal. On the other hand, if the image formed on the sheet Sh has stain, streaks or the like, the image inspection device 3 determines that the image is abnormal. The image inspection device 3 decides whether the image formed on the sheet Sh is normal or abnormal, by comparing a read image 603a obtained by scanning the image formed on the sheet Sh, with a reference image 603b shown in FIG. 3 which will be described later.

Figure 3:
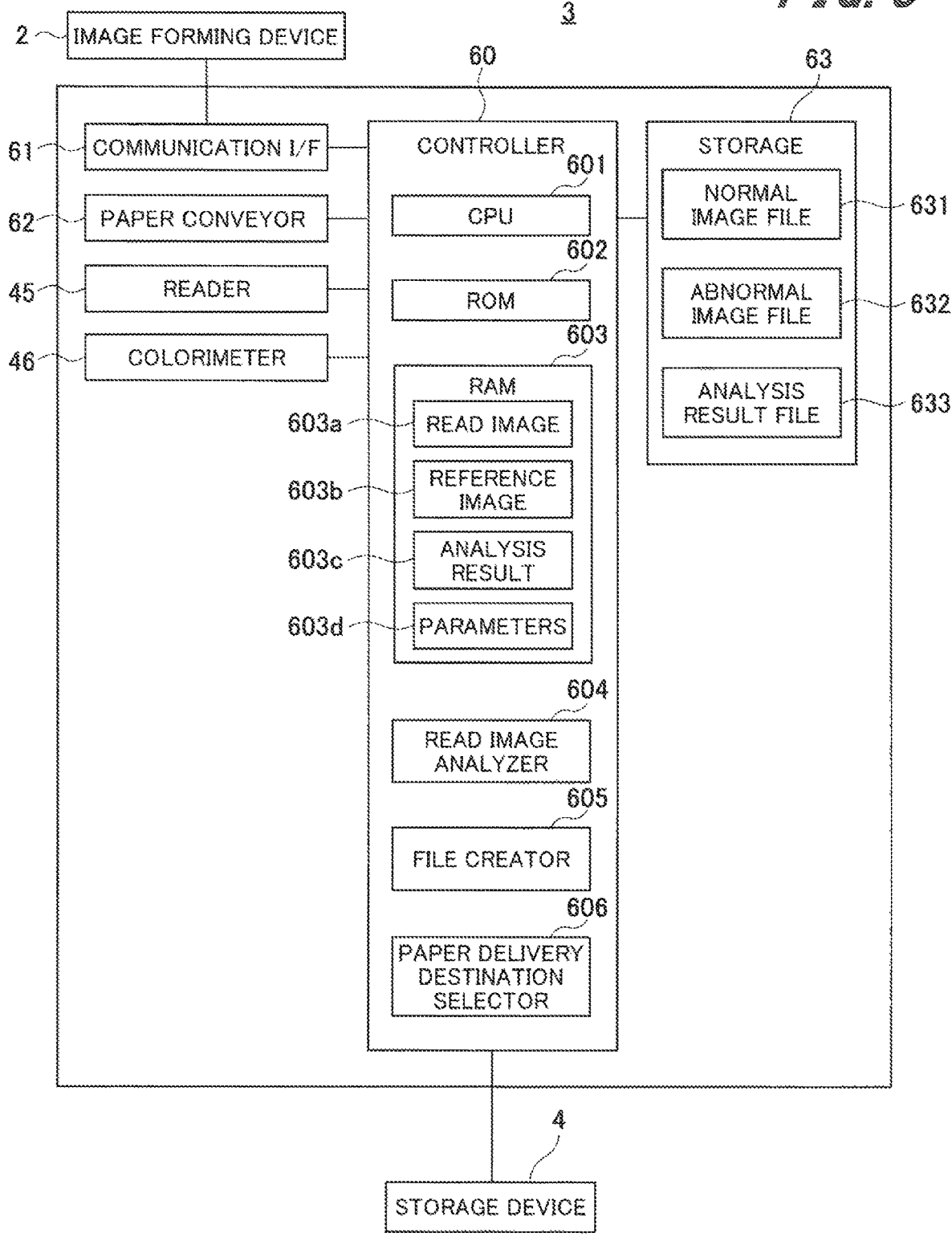
FIG. 3 is a block diagram which shows an example of the control system configuration of an image inspection device according to one or more embodiments.

As shown in FIG. 3 which will be described later, the image inspection device 3 creates, for each job, a normal image file 631 which collects images determined as normal and an abnormal image file 632 which collects images determined as abnormal. Furthermore, the image inspection device 3 creates an analysis result file 633 which combines the normal image file 631 and abnormal image file 632. The files are stored in a storage 63. The image inspection device 3 sends the analysis result file 633 to the image forming device 2. The image forming device 2 can show the content of the analysis result file 633 on an operation display 13. Therefore, the user of the image forming device 2 can check the content of the analysis result file 633 according to the content shown on the operation display 13.

The image forming device 2 includes an image input section 11 with an automatic original feeder (ADF: Auto Document Feeder) 12, the operation display 13 and a printer 10 with a paper feed tray 20 and an image forming section 30.

The image input section 11 optically reads an image from an original document on the original holder of the ADF 12 and makes A/D conversion of the read image to create image data (scan data). The image input section 11 can also read an image on a platen glass.

The operation display 13 includes a display part as a liquid crystal panel or the like and an operation part as a touch sensor or the like. The display part and operation part are integrated, for example, as a touch panel. The operation display 13 generates an operation signal which represents the content of a user operation entered into the operation part, and supplies the operation signal to a controller 50 (see FIG. 2 which will be described later). The operation display 13 displays the content of the user operation, user-specified information and the like on the display part according to a display signal supplied from the controller 50. The operation part may be a mouse or tablet which is separate from the display part.

The paper feed trays 20 are containers for housing sheets Sh on which an image is formed in the image forming section 30. The paper type and basis weight of housed sheets are different among the paper feed trays 20. In one or more embodiments, two paper feed trays 20 are assumed to be provided, but the number of paper feed trays 20 may be one or three or more.

The image forming device 2 includes a conveying path 21 which conveys the sheet Sh supplied from the paper feed tray 20 to the image inspection device 3. The conveying path 21 is provided with a plurality of conveying rollers to convey sheets Sh.

On the downstream of a fixing section 36, the conveying path 21 extends and joins a conveying path 41 of the image inspection device 3. Also, the conveying path 21 is connected to an inversion conveying path 22 which branches off on the downstream of the fixing section 36 and joins the conveying path 21 on the upstream of the printer 10. The inversion conveying path 22 includes an inversion section 23 which inverts a sheet Sh. The sheet Sh inverted in the inversion section 23 is passed through the inversion conveying path 22 and returned to the upstream side of the conveying path 21. After the sheet Sh inverted by switching the path is returned to the conveying path 21 on the downstream of the fixing section 36, it may be conveyed to the image inspection device 3.

The image forming section 30 includes four image forming units 31Y, 31M, 31C, and 31K to form toner images of colors Y, M, C, and K respectively to form an image on the sheet Sh. The image forming units 31Y, 31M, 31C, and 31K each include an electric charging section (not shown) and an exposure section (not shown), and include photoreceptor drums 32Y, 32M, 32C, and 32K as image carriers and development sections 33Y, 33M, 33C, and 33K respectively.

The development sections 33Y, 33M, 33C, and 33K irradiate the surfaces (outer peripheries) of the photoreceptor drums 32Y, 32M, 32C, and 32K with light depending on the image, to form electrostatic latent images on the peripheries of the photoreceptor drums. The development sections 33Y, 33M, 33C, and 33K make toners adhere to the electrostatic latent images to form toner images on the photoreceptor drums 32Y, 32M, 32C, and 32K respectively.

Furthermore, the image forming section 30 includes an intermediate transfer belt 34, a secondary transfer part 35, and the fixing section 36. The intermediate transfer belt 34 is a belt to which the images formed on the photoreceptor drums 32Y, 32M, 32C, and 32K are primarily transferred. The secondary transfer part 35 is a roller which makes a secondary transfer of each of the different color toner images primarily transferred to the intermediate transfer belt 34 to the sheet Sh conveyed by the conveying path 21.

The fixing section 36 is located downstream of the secondary transfer part 35 in the paper conveying direction to perform a fixing process on the sheet Sh with a color toner image formed, which is supplied from the image forming section 30. The fixing section 36 applies heat and pressure to the conveyed sheet Sh to fix the image transferred by the image forming section 30, on the front side of the sheet Sh. The sheet Sh with the image fixed by the fixing section 36 is conveyed by the conveying path 21 to the image inspection device 3 or passed through the inversion conveying path 22 and inverted by the inversion section 23 before being returned to the conveying path 21 on the upstream side of the printer 10. An image is formed on the back side of the inverted sheet Sh by the printer 10. Then, the sheet Sh is subjected to the fixing process by the fixing section 36 and conveyed to the image inspection device 3.

The image inspection device 3 includes conveying paths 41, 42, and 43 for conveying the sheet Sh conveyed from the image forming device 2, a switcher 44, readers 45*a* and 45*b*, colorimeters 46*a* and 46*b*, and paper delivery trays 47 and 48 to which the sheet Sh conveyed on the conveying path 41 is delivered.

The readers 45*a* and 45*b* are examples of image input devices such as image sensors. For example, the readers 45*a* and 45*b* cast light on the surface of the sheet Sh and take in the reflected light from the sheet Sh as image data. The process in which the readers 45*a* and 45*b* take in image data from the sheet Sh in this way is called "reading". The image data from the sheet Sh is called "read image". The reader 45*a* reads the sheet Sh conveyed on the conveying path 41 from under the conveying path 41 and the reader 45*b* reads the sheet Sh conveyed on the conveying path 41 from above the conveying path 41. In the explanation given below, the readers 45*a* and 45*b* are collectively called the "reader 45" because they need not be distinguished. The reader 45 sends the read image from the sheet Sh to a controller 60 (see FIG. 3 which will be described later). The controller 60 stores the read image received from the reader 45 as a read image 603*a* in a RAM 603. Therefore, the read image created by the reader 45 is the same as the read image stored in the RAM 603.

The colorimeters 46*a* and 46*b* are examples of color densitometers which read the images formed on the upper and lower sides of the sheet Sh conveyed on the conveying path 41 and measure the color densities (reflection densities) of the images according to the image data obtained by reading. The colorimeter 46*a* reads the sheet Sh conveyed on the conveying path 41 from under the conveying path 41 and the colorimeter 46*b* reads the sheet Sh conveyed on the conveying path 41 from above the conveying path 41. In the explanation given below, the colorimeters 46*a* and 46*b* are collectively called the "colorimeter 46" because they need not be distinguished. The colorimeter 46 sends the measured color density data to the controller 60 of the image inspection device 3 (see FIG. 3). The color density data sent from the colorimeter 46 to the image inspection device 3 may be contained in the read image 603*a*.

The image inspection device 3 includes conveying paths 42 and 43 which are connected to the conveying path 41.

The conveying path 42 is a path which branches off from the conveying path 41 to deliver the sheet Sh inspected by the image inspection device 3 to a paper delivery tray 47 (an example of the paper delivery part). The paper delivery tray 47 receives the sheet Sh with an image determined as normal by the image inspection device 3 (called a "normal sheet Sh").

The conveying path 43 is also a path which branches off from the conveying path 41 to deliver the sheet Sh inspected by the image inspection device 3 to a paper delivery tray 48 (an example of the paper delivery part). The paper delivery tray 48 receives the sheet Sh with an image determined as abnormal by the image inspection device 3 (called an "abnormal sheet Sh").

The switcher 44 changes the conveying direction for the sheet Sh so that the sheet Sh is conveyed to the conveying path 42 or 43. If the image inspection device 3 has only one paper delivery tray 47, both normal sheets Sh and abnormal sheets Sh are delivered to the tray 47. If that is the case, the normal sheets Sh and abnormal sheets Sh are delivered in a manner that they are slightly out of alignment in the direction perpendicular to the paper delivery direction.

Since in one or more embodiments the image forming device 100 can form an image on both the sides of the sheet Sh, the above explanation has been made by taking an example that the image inspection device 3 inspects both the sides of the sheet Sh. However, if the sheet Sh is conveyed from the image forming device which can form an image on only one side of the sheet Sh, the image inspection device 3 may be configured to inspect only one side of the sheet Sh.

Control System Configuration of the Image Forming Device

Next, an example of the control system configuration of the image forming device 2 will be described referring to FIG. 2.

Figure 2:
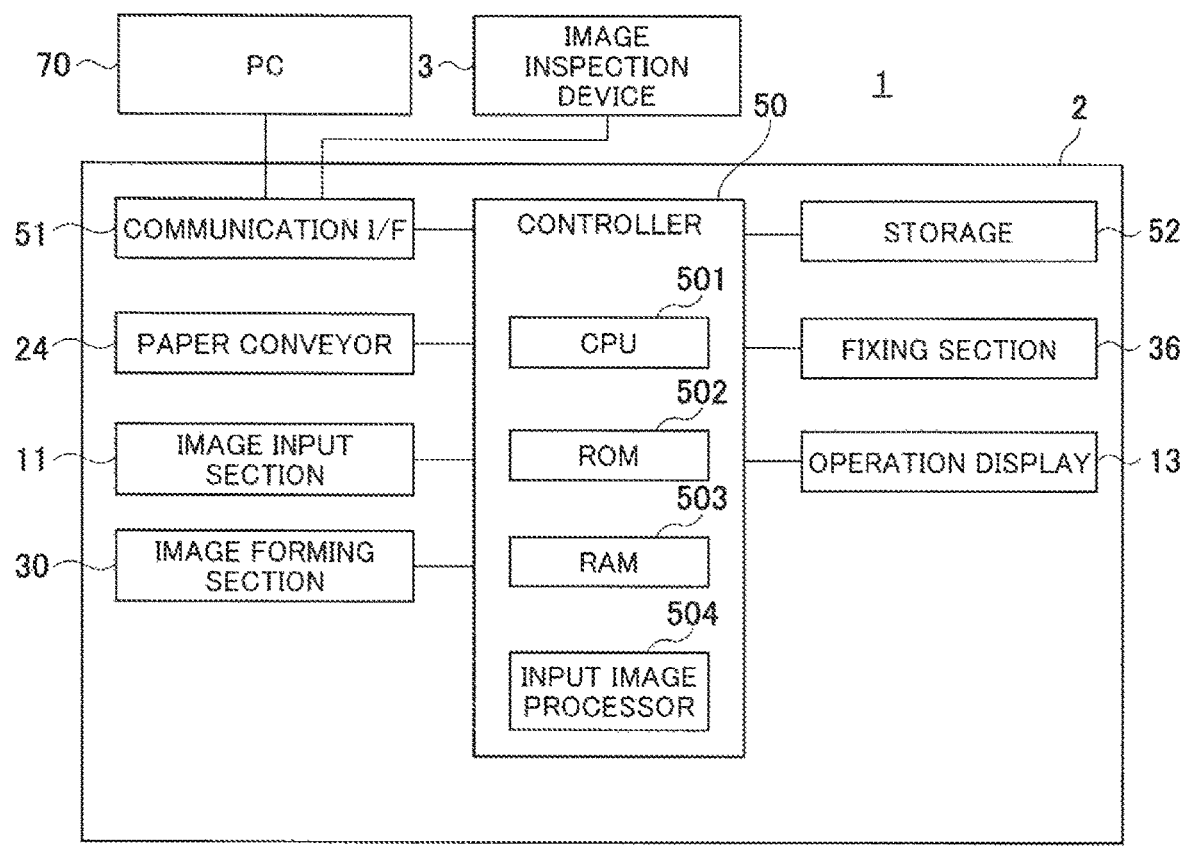
FIG. 2 is a block diagram which shows an example of the control system configuration of an image forming device according to one or more embodiments of the present invention.

FIG. 2 is a block diagram which shows an example of the control system configuration of the image forming device 2.

The image forming device 2 includes a communication I/F 51, a paper conveyor 24, the image input section 11, the image forming section 30, the controller 50, a storage 52, the fixing section 36, and the operation display 13.

The communication I/F 51 is an interface which performs data transmission and reception with the PC 70 as a terminal operated by the user via a network or special line. For example, an NIC (Network Interface Card) is used for the communication I/F 50.

The paper conveyor 24 drives the conveying rollers (not shown) located on the conveying path 21 and inversion conveying path 22 shown in FIG. 1 and the inversion section 23 under the control by the controller 50.

The controller 50 includes a CPU (Central Processing Unit) 501, a ROM (Read Only Memory) 502, a RAM (Random Access Memory) 503, and an input image processor 504.

The ROM 502 stores the program to be executed by the CPU 501 of the controller 50 or data to be used for execution of the program or the like. The ROM 502 is used as an example of a non-transitory computer-readable recording medium storing the program to be executed by the CPU 501. Thus, the program is permanently stored in the ROM 502. The CPU 501 reads the program stored in the ROM 502 to control the constituent elements of the image forming device 2.

In the RAM 503, variables or parameters which are generated during arithmetic processing by the CPU 501 are written temporarily.

The input image processor 504 performs image processing of the input image contained in the job entered through the communication I/F 51 from the PC 70 in a prescribed manner to create image data for printing. The input image processor 504 also performs image processing of the image data acquired from the original read on the ADF 12 by the image input section 11 or the image data acquired from outside and creates image data for printing. The image data for printing is sent to the image forming section 30.

The controller 50 controls the paper conveyor 24 to drive the conveying rollers and convey the sheet Sh on the conveying path 21. Furthermore, the controller 50 sends the image data for printing as created by the input image processor 504 to the image forming section 30. The controller 50 also controls the image forming section 30 to form an image on the sheet Sh. The controller 50 also controls the fixing section 36 to fix the image on the sheet Sh.

In addition, the controller 50 receives an operation signal from the operation display 13 and performs control according to the operation signal. Furthermore, the controller 50 sends a display signal to the operation display 13 so that the operation display 13 shows, on a display panel, various setup screens for input of various operation commands and setup information, and an operation screen for showing various processing results and the like.

The storage 52 stores the parameters which the CPU 501 of the controller 50 uses to execute the program, and data obtained by execution of the program and the like. For example, the storage 52 stores information such as image forming conditions with different density levels. The storage 52 may store the program to be executed by the CPU 501.

Control System Configuration of the Image Inspection Device

Next, an example of the control system configuration of the image inspection device 3 will be described referring to FIG. 3.

FIG. 3 is a block diagram which shows an example of the control system configuration of the image inspection device 3. Among the constituent elements shown in FIG. 3, the same ones as shown in FIG. 1 are designated by the same reference signs and repeated description thereof is omitted.

The image inspection device 3 includes a communication I/F 61, a paper conveyor 62, the reader 45, the colorimeter 46, the controller 60, and the storage 63.

The communication I/F 61 is an interface which performs data transmission and reception with the image forming device 2 via a network. For example, an NIC can be used for the communication I/F 61.

The paper conveyor 62 drives the conveying rollers (not shown) located on the conveying path 41 shown in FIG. 1 under the control by the controller 60.

As mentioned above, the reader 45 reads the images formed on the upper and lower sides of the sheet Sh conveyed on the conveying path 41. The image read by the reader 45 is stored as a read image 603a in the RAM 603 of the controller 60. Instead, the read image 603a may be stored in the storage 63.

The colorimeter 46 is a colorimeter which can measure the intensity (spectrum) of reflected light with each wavelength of light and outputs the measured color density (reflection density) and the value of L*a*b*. For the colorimeter 46, for example, a scanner (line sensor) is used in which a plurality of sensors (photoelectric conversion elements) (not shown) are one-dimensionally arranged in the paper width direction (direction perpendicular to the paper conveying direction) along the entire paper width. If a scanner is used as the colorimeter 46, the image is read by moving the scanner in the direction (paper conveying direction) perpendicular to the direction of its arrangement. The colorimeter 46 measures each of divisions obtained by dividing the area for reading the image in a mesh-like pattern to obtain the color density of the image formed on the sheet Sh.

Instead, the colorimeter 46 may include only one sensor and measure the image color density by moving the sensor two-dimensionally. Alternatively, the colorimeter 46 may include a plurality of sensors arranged two-dimensionally (in a matrix pattern) so that the sensors read the color densities of all the pixels on the sheet at one time of measurement.

The controller 60 includes a CPU 601, a ROM 602, the RAM 603, a read image analyzer 604, a file creator 605, and a paper delivery destination selector 606.

The CPU 601 reads the program stored in the ROM 602 to control the constituent elements of the image inspection device 3.

The ROM 602 stores the program to be executed by the CPU 601 of the controller 60 or data to be used for execution of the program or the like. The ROM 602 is used as an example of a non-transitory computer-readable recording medium storing the program to be executed by the CPU 601. Thus, the program is permanently stored in the ROM 602.

In the RAM 603, variables or parameters which are generated during arithmetic processing by the CPU 601 are written temporarily. The RAM 603 not only stores the read image 603a as mentioned above, but also stores a reference image 603b obtained by the reader 45 reading an image for reference in advance. Furthermore, the RAM 603 stores an analysis result 603c and parameters 603d.

The CPU 601 executes the program read from the ROM 602 so that the read image analyzer 604, file creator 605, and paper delivery destination selector 606 perform their functions.

The read image analyzer 604 compares the read image 603a read from the RAM 603 with the reference image 603b stored in the RAM 603 previously on a page-by-page basis. For a one-side printed sheet Sh, comparison is made of one page of the one side on which an image is formed and for a double-side printed sheet Sh, comparison is made of two pages of the both sides on which images are formed. The read image analyzer 604 determines the read image 603a as normal if there is no difference between the read image 603a and the reference image 603b.

In addition, the read image analyzer 604 analyzes the read image 603a and detects whether the read image 603a is normal or abnormal. For example, if an image printed on a certain page is stained or dirty, the read image 603a on this page should be different from the reference image 603b. Therefore, when the read image analyzer 604 compares the read image 603a with the reference image 603b and finds a difference, it determines the read image 603a as abnormal. Then, the read image analyzer 604 records the fact that it has found the read image 603a on this page different and determined it as abnormal, in the analysis result 603c.

The analysis result 603c is information which includes, for example, the position and size of stain which has caused the read image 603a to be determined as abnormal, the number of the page where the abnormality is found, and so on. If the read image 603a is determined as normal, information which includes the number of the page determined as normal is also recorded in the analysis result 603c. The read image analyzer 604 stores the analysis result 603c in the RAM 603, but instead it may store the analysis result 603c in the storage 63.

The parameters 603d are various values set by the controller 60. The read image analyzer 604, file creator 605, and paper delivery destination selector 606 perform processing according to set values read from the parameters 603d.

Here, the read image analyzer 604 can instruct the image forming device 2 to perform reprinting (called the "recovery process") of the page corresponding to the read image 603a determined as abnormal, through the communication I/F 61. The recovery process enables the image forming device 2 to form again (re-form) the image corresponding to the read image 603a determined as abnormal by the read image analyzer 604. The recovery process is performed automatically by the image forming system 1 or manually by the user. However, when the recovery process is performed, processing by the image forming device 2 takes longer time. For this reason, the user of the image forming system 1 can select in advance whether to instruct the image forming device 2 to perform the recovery process when an image is determined as abnormal.

If the image forming device 2 is preset to perform the recovery process, it automatically performs the recovery process for the page corresponding to the read image 603a determined as abnormal according to an instruction from the read image analyzer 604. As mentioned above, a normal sheet Sh is delivered to the paper delivery tray 47 and an abnormal sheet Sh is delivered to the paper delivery tray 48. Therefore, the paper delivery tray 47 receives only a normal sheet Sh printed by the initial image forming process and a normal sheet Sh printed by the recovery process.

According to the analysis result 603c of the read image analyzer 604, the file creator 605 creates a normal image file 631 containing a read image 603a in which no abnormality has been detected, and creates an abnormal image file 632 containing a read image 603a in which an abnormality has been detected. Then, the file creator 605 creates an analysis result file 633 containing either the normal image file 631 or the abnormal image file 632 or both the normal image file 631 and abnormal image file 632. In the explanation below, the normal image file 631, abnormal image file 632, and analysis result file 633 are also collectively called the "image file".

Here, according to a setting made by the user through the operation display 13 of the image forming device 2, the file creator 605 can create an abnormal image file 632 containing the read image 603a of the current job, as created by the reader 45 reading the image formed on a sheet Sh by the image forming device 2 through execution of the current job, in preference to a normal image file 631 containing the read image 603a of the current job. Alternatively, the file creator 605 may create a normal image file 631 concurrently with creation of an abnormal image file 632. The preferentially created abnormal image file 632 may be put in the first page of the analysis result file 633 and the subsequently created normal image file 631 may be put in a later page of the analysis result file 633. Alternatively, an analysis result file 633 containing only the preferentially created abnormal image file 632 may be first created and an analysis result file 633 containing only the subsequently created normal image file 631 may be created separately.

In addition, the file creator 605 can also create an abnormal image file 632 containing the read image 603a of another job as created by the reader 45 reading the image formed on a sheet Sh by the image forming device 2 through execution of the other job after the current job, in preference to a normal image file 631 containing the read image 603a of the current job. In this case, an analysis result file 633 containing the content of the abnormal image file 632 created from the read image 603a of the other job is preferentially created. Here, the current job and the other job are both jobs which are executed by the image forming device 2 and the other job is executed after the current job. In the explanation below, the next job which is executed just after the current job is taken as an example of the other job; however, the other job may be a job which is executed after the next job.

In some cases, since the size of a normal image file 631 is very large, if creation of a normal image file 631 is done concurrently with creation of an abnormal image file 632, it takes a long time to complete creation of the abnormal image file 632. For this reason, if the read image 603a of the other job as analyzed by the read image analyzer 604 is detected as abnormal, the file creator 605 can stop the process to create a normal image file 631 from the read image 603a of the current job and preferentially create an abnormal image file 632 from the read image 603a of the other job. In this case, the content of the abnormal image file 632 is taken into the analysis result file 633 in preference to the content of the normal image file 631. Then, the read image 603a which is contained in the abnormal image file 632 and detected as abnormal is put in the first page of the analysis result file 633 and the read image 603a which is contained in the normal image file 631 and not detected as abnormal is put in a later page. However, the order of pages is arbitrary; for example, read images 603a may be arranged in the chronological order in which they were created.

Furthermore, according to a user setting, the file creator 605 can create either a normal image file 631 or an abnormal image file 632. In this case, the file creator 605 takes only one of the normal image file 631 and abnormal image file 632 in the analysis result file 633. The file creator 605 creates a normal image file 631, an abnormal image file 632, or an analysis result file 633 per job, per collated set, per a prescribed number of pages or per a prescribed file size.

The file creator 605 can create not only a normal image file 631 or an abnormal image file 632 containing the read image 603a but also text data containing the analysis result 603c. These files are created as PDF (Portable Document Format) files, JPEG (Joint Photographic Experts Group) files or the like. The analysis result file 633 created by the file creator 605 may contain text data such as a page number and coordinates indicating the position of abnormality. An image file created by the file creator 605 is not only stored in the storage 63 but also sent to an external storage device 4 connected to the image inspection device 3. For example, the storage device 4 may be a USB memory, an SSD, an HDD (Hard Disk Drive) or the like connected to the image inspection device 3. Therefore, the user can cause the image file stored in the storage device 4 to be displayed and confirm the content of the file. The image file may be transferred to a cloud server connected through the communication I/F 61 or the PC 70 and stored there.

The paper delivery destination selector 606 selects the paper delivery tray (an example of the paper delivery destination) for the sheet Sh conveyed on the conveying path 41 according to the analysis result 603c. For example, if the analysis result 603c indicates that the image formed on the sheet Sh is normal, this sheet Sh is a normal sheet Sh. Thus, the paper delivery destination selector 606 activates the switcher 44 to cause the conveying path 42 to convey the normal sheet Sh and deliver it to the paper delivery tray 47. On the other hand, if the analysis result 603c indicates that the image formed on the sheet Sh is abnormal, this sheet Sh is an abnormal sheet Sh. Thus, the paper delivery destination selector 606 activates the switcher 44 to cause the conveying path 43 to convey the abnormal sheet Sh and deliver it to the paper delivery tray 48.

The storage 63 is a large-capacity HDD or the like. The storage 63 stores the normal image file 631 and abnormal image file 632 which are created by the file creator 605. The normal image file 631 and abnormal image file 632 are also combined into one analysis result file 633. Then, the controller 60 reads the analysis result file 633 from the storage 63 as necessary and sends it to the image forming device 2 through the communication I/F 61. The operation display 13 of the image forming device 2 can display the content of the analysis result file 633.

The normal image file 631 and abnormal image file 632 have the following two uses.

(1) Use of the Normal Image File 631

The normal image file 631 is used as evidence which indicates creation of normal sheets Sh. For example, after taking normal sheets Sh out from the paper delivery tray 47, even if some of the normal sheets Sh are missing or stained, the user can confirm that a correct number of pages of normal sheets Sh have been produced, by checking the content of the normal image file 631. For this purpose, the file creator 605 creates a file which collects only the images of the normal sheets Sh delivered to the paper delivery tray 47, as a normal image file 631. The normal image file 631 is used by, for example, a printing operator who uses the image forming system 1 or an end user which entrusts the printing operator with a printing job.

(2) Use of the Abnormal Image File 632

The abnormal image file 632 is used to show the user in which part of which page the abnormality in the image determined as abnormal by the read image analyzer 604 has occurred. For this purpose, the file creator 605 creates a file which collects only the images of the abnormal sheets Sh delivered to the paper delivery tray 48, as an abnormal image file 632. The abnormal image file 632 is mainly used by a printing operator who uses the image forming system 1 and an inspector of printed matter.

As mentioned above, the normal image file 631 and abnormal image file 632 are used for different purposes. Therefore, in one or more embodiments, the normal image file 631 and abnormal image file 632 are created separately. Consequently, the user can confirm that printing has been made properly and separately know what kind of abnormality has occurred, without confusing a normal image and an abnormal image.

As mentioned above, the abnormal image file 632 is required to check printing operation. Usually, the number of pages in an abnormal image file 632 is smaller than the number of pages in a normal image file 631. Therefore, the file creator 605 creates an abnormal image file 632 in preference to a normal image file 631. This means that the file creator 605 can create a normal image file 631 after completion of creation of an abnormal image file 632. For example, if the image forming device 2 starts the next job after completion of the current job, the file creator 605 temporarily stops creation of a normal image file 631 for the current job and preferentially creates an abnormal image file 632 for the next job.

Therefore, the file creator 605 restarts creation of the remaining part of the normal image file 631 for the current job immediately after completion of creation of the abnormal image file 632 for the next job. Then, the file creator 605 creates a normal image file 631 for the next job after completion of creation of the remaining part of the normal image file 631 for the current job. Next, this processing sequence will be described in detail referring to FIG. 4.

Figure 4:
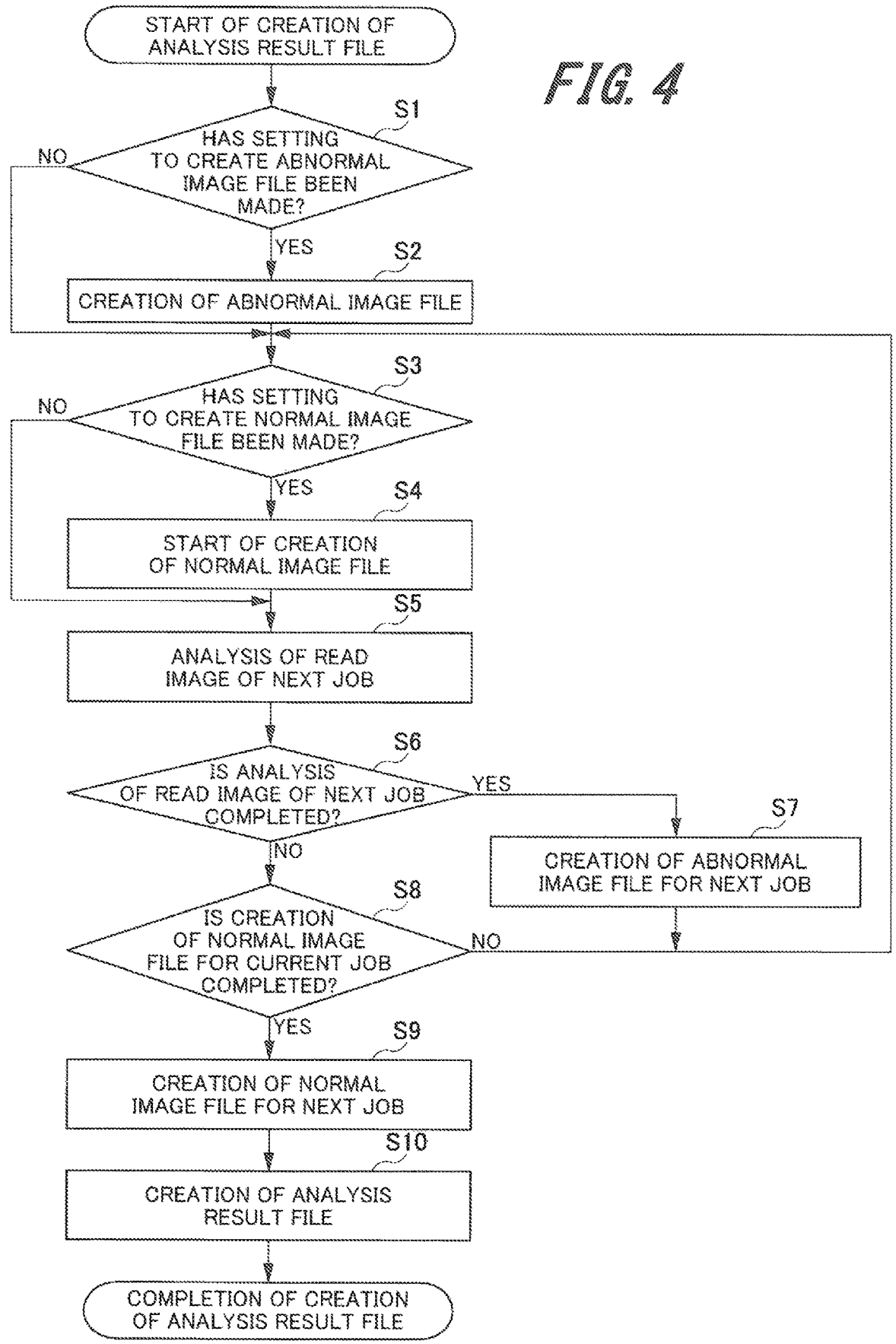
FIG. 4 is a flowchart which shows an example of the process for a file creator according to one or more embodiments of the present invention to create an analysis result file.

FIG. 4 is a flowchart which shows an example of the process for the file creator 605 to create an analysis result file 633. In the explanation below, it is assumed that the image forming device 2 has executed the current job and then the next job to form images on sheets Sh and deliver the sheets Sh to the image inspection device 3. Before starting the sequence in the flowchart, the read image analyzer 604 is assumed to have finished analyzing the read image 603a of the current job.

First, the file creator 605 decides whether or not the user has made a setting to instruct the creation of an abnormal image file 632 (S1). This decision is made by the read image analyzer 604 reading a value set in the parameters 603d. If the setting to instruct the creation of an abnormal image file 632 has not been made (NO at S1), the sequence goes to Step S3. In this case, the file creator 605 does not create an abnormal image file 632.

On the other hand, if a setting to instruct the creation of an abnormal image file 632 has been made (YES at S1), the file creator 605 creates an abnormal image file 632 according to the read image 603a determined as abnormal by the read image analyzer 604 (S2).

After NO at Step S1 or after Step S2, the file creator 605 decides whether or not the user has made a setting to instruct the creation of a normal image file 631 (S3). This decision is also made by the read image analyzer 604 reading a value set in the parameters 603d. If a setting to instruct the creation of a normal image file 631 has not been made (NO at S3), the sequence goes to Step S5. In this case, the file creator 605 does not create a normal image file 631.

On the other hand, if a setting to instruct the creation of a normal image file 631 has been made (YES at S3), the file creator 605 starts creating a normal image file 631 according to the read image 603a determined as normal by the read image analyzer 604 (S4).

In the course of the process to create a normal image file 631 at Step S4, the read image analyzer 604 analyzes the read image 603a of the next job and if an abnormality is detected in the read image 603a of the next job, the process to create an abnormal image file 632 indicating this abnormality is inserted into the series of steps. Thus, the next step S5 is started before the end of creation of a normal image file 631 at Step S4.

Next, the read image analyzer 604 analyzes the read image 603a created by the reader 45 from the sheet Sh conveyed to the image inspection device 3 from the image forming device 2 which has executed the next job (S5).

Next, the file creator 605 decides whether or not the analysis of the read image 603a of the next job by the read image analyzer 604 is completed (S6). If the analysis of the read image 603a of the next job is completed (YES at S6), the file creator 605 preferentially creates an abnormal image file 632 for the next job (S7). Then, the sequence goes back to Step S3 and the subsequent steps are repeated.

On the other hand, if the analysis of the read image 603a of the next job is not completed (NO at S6), the file creator 605 decides whether or not the creation of a normal image file 631 for the current job is completed (S8). If the creation of a normal image file 631 for the current job is not completed (NO at S8), the sequence goes back to Step S3 and the subsequent steps are repeated.

On the other hand, if the creation of a normal image file 631 for the current job is completed (YES at S8), the file creator 605 creates a normal image file 631 for the next job (S9).

Then, the file creator 605 creates an analysis result file 633 containing the normal image file 631 and abnormal image file 632 for the current job. Then, the file creator 605 also creates an analysis result file 633 containing the normal image file 631 and abnormal image file 632 for the next job (S10). The processing sequence shown in the flowchart is thus completed.

Basically, the file creator 605 creates a normal image file 631, an abnormal image file 632, and an analysis result file 633 on a job-by-job basis. However, usually the number of pages of normal sheets Sh is much larger than the number of pages of abnormal sheets Sh. Thus, the size of the normal image file 631 created from the read images 603a of the normal sheets Sh may be very large to the extent that it is difficult to use the normal image file 631. Similarly, the size of the analysis result file 633 containing the content of the normal image file 631 may be very large. Furthermore, if the image forming device 2 is improperly adjusted, the size of the abnormal image file 632 may be very large.

For example, depending on the environment in which the image forming system 1 is used, the file system cannot handle a very large image file. For this reason, if the size of an image file is very large, the file creator 605 divides the image file by the collated set, a prescribed number of pages or prescribed file size so that the image file can be handled regardless of the environment.

FIG. 5 is a flowchart which shows an example of the process to limit the amount of each image file. This process is intended to limit the amount of each image file created by the file creator 605, for example, to the prescribed number of pages or prescribed file size stored in the RAM 603.

First, the file creator 605 starts creating a normal image file 631 or an abnormal image file 632 (S11). As explained above about Steps S1 and S3 in FIG. 4, in this process, the following steps are carried out on the image file which is created when either a setting to instruct the creation of a normal image file 631 or a setting to instruct the creation of an abnormal image file 632 is made or both the settings are made.

The file creator 605 decides whether or not the size of the image file under creation is larger than or equal to the prescribed size or the number of pages of the image file is larger than or equal to the prescribed number of pages (S12). This decision is made by the read image analyzer 604 reading a value set in the parameters 603d. If the size of the image file under creation is smaller than the prescribed size and the number of pages of the image file is smaller than the prescribed number of pages (NO at S12), the file creator 605 continues the process to create the image file and repeats Step S12.

On the other hand, if the size of the image file under creation is larger than or equal to the prescribed size or the number of pages of the image file is larger than or equal to the prescribed number of pages (YES at S12), the file creator 605 closes the file and starts creation of the next image file (S13).

Next, the file creator 605 decides whether or not the creation of the image file for all the pages of the current job is completed (S14). If the creation of the image file for all the pages is not completed (NO at S14), the sequence goes back to Step S12 and the file creator 605 continues the creation of the image file. On the other hand, if the creation of the image file for all the pages is completed (YES at S14), this sequence is ended.

Display Examples of the Analysis Result

Next, display examples of an analysis result which is displayed for the user to confirm the contents of the normal image file 631 and abnormal image file 632 will be explained referring to FIGS. 6 to 8. The screens shown in FIGS. 6 to 8 appear on the operation display 13 of the image forming device 2, the display of the PC 70, and the like.

FIG. 6 is an explanatory drawing which shows a display example of a file list screen W1.

The file list screen W1 is a screen which lists the filenames of analysis result files 633 along with the date and time of inspection. The file list screen W1 shows the following items: inspection number (No.), DATE AND TIME OF INSPECTION, FILENAME, ABNORMALITY TYPE, CREATED, and LINK TO REPORT PAGE. The filenames of the analysis result files 633 are shown in the descending order of the inspection number and the date and time of inspection. Instead, the file list screen W1 may list the filenames of normal image files 631 or abnormal image files 632 along with the date and time of inspection.

In the ABNORMALITY TYPE column, the type of abnormality found by analysis of the read image 603a by the read image analyzer 604 is shown. The type of abnormality is, for example, stain.

In the CREATED column, "Created" is shown to indicate that the analysis result file 633 has been created.

In the LINK TO REPORT PAGE column, a link button marked "REPORT PAGE" is shown. When the user pushes the link button, an analysis result report R1 as shown in FIG. 7 appears.

FIG. 7 is an explanatory drawing which shows a display example of the analysis result report R1.

The analysis result report R1 shows the following items: DATE AND TIME OF INSPECTION, MODEL, SERIAL NO., JOB NAME, JOB SETTINGS, TOTAL NUMBER OF ABNORMAL PAGES, and ABNORMALITY.

For DATE AND TIME OF INSPECTION, the date and time of inspection is shown.

For MODEL, the name of the printing device (image forming device 2) which has printed the image as the object of inspection on the sheet Sh is shown.

For SERIAL NO., the serial number allocated to identify the printing device (image forming device 2) uniquely is shown.

For JOB NAME, the job name of the job executed by the printing device (image forming device 2) is shown.

For JOB SETTINGS, the total number of print copies, the total number of pages, and the total number of sheets which are delivered with execution of the job are shown. For example, if a plurality of image pages are printed on one sheet, the number of sheets and the number of pages are different. The number of copies is basically the same as the number of sheets.

For TOTAL NUMBER OF ABNORMAL PAGES, the number of pages containing an abnormality found by analysis of the read image 603a by the read image analyzer 604 is shown as the total number of abnormal images.

For ABNORMALITY, whether to turn on or off the switch to analyze the read image 603a and the level of abnormality detection are shown. If ON is selected for the switch, the read image analyzer 604 analyzes the read image 603a to check whether the image is normal or abnormal. On the other hand, if OFF is selected for the switch, the read image analyzer 604 does not analyze the read image 603a. The read image analyzer 604 determines the presence/absence of abnormality depending on the level. For example, a prescribed value is assigned to a level and the read image analyzer 604 detects stain, etc. larger than the value assigned to the level as an abnormality. For example, at level 1, stain not smaller than 0.1 mm is detected as an abnormality and at level 3, stain not smaller than 0.5 mm is detected as an abnormality.

The ABNORMAL PAGE button and NORMAL PAGE button are shown at the bottom of the analysis result report R1. When the user pushes the ABNORMAL PAGE button, abnormal pages as read images 603a of abnormal sheets Sh are listed as shown in FIG. 8. On the other hand, when the user pushes the NORMAL PAGE button, normal pages as read images 603a of normal sheets Sh are listed as shown in FIG. 9.

Figure 8:
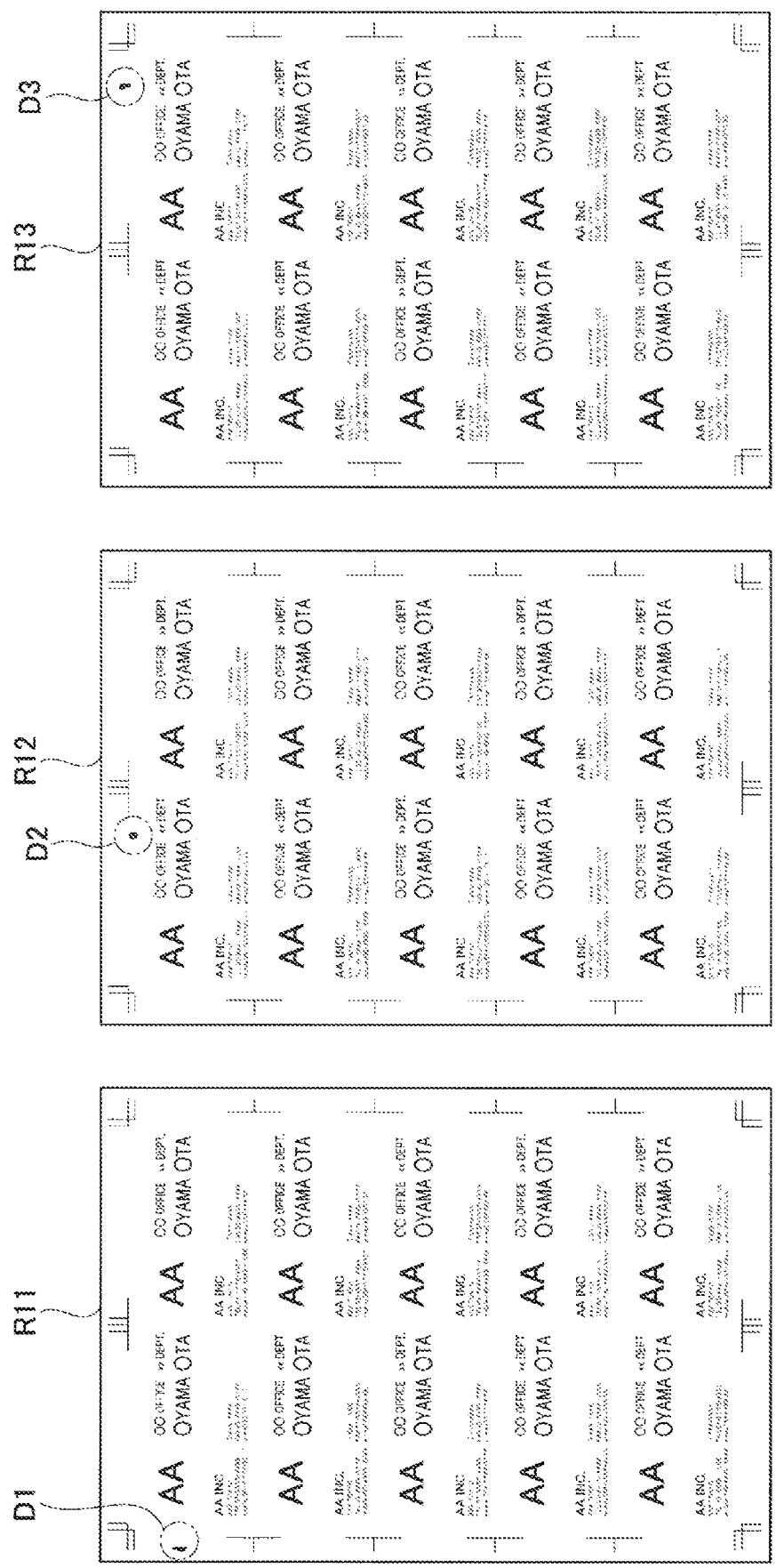
FIG. 8 is an explanatory drawing which shows a display example of abnormal pages according to one or more embodiments of the present invention.

FIG. 8 is an explanatory drawing which shows a display example of abnormal pages.

As shown in the analysis result report R1 of FIG. 7, the number of pages of the sheets Sh detected as abnormal by the read image analyzer 604 is 3. When the user pushes the ABNORMAL PAGE button in the analysis result report R1, abnormal pages R11 to R13 appear as shown in FIG. 8. The abnormal pages R11 to R13 are preferentially put in the initial pages of the analysis result report R1 (for example, pages 1 to 3). In the abnormal pages R11 to R13 thus shown, the positions and sizes of stains on the abnormal sheets Sh are indicated by chain line circles D1 to D3. In addition, the page numbers may be shown along with the abnormal pages R11 to R13, though not shown. In that case, the user can know which sheet is stained and how it is stained.

FIG. 9 is an explanatory drawing which shows a display example of normal pages.

As shown in the analysis result report R1 of FIG. 7, the number of pages of the sheets detected as normal by the read image analyzer 604 is 497, which is calculated by subtracting the total number of abnormal pages from the total number of sheets. When the user pushes the NORMAL PAGE button in the analysis result report R1, normal pages R21 to R23 appear as shown in FIG. 9. The normal pages R21 to R23 represent the read images 603a of the three pages selected from the 497 pages. When the normal pages were inspected is known from the analysis result report R1. Also, the number of pages of delivered normal sheets Sh is known. Thus, the normal pages can be used as evidence.

In the image forming system 1 according to one or more embodiments described so far, a file which collects only the images of normal sheets Sh is created as a normal image file 631 and the content of the normal image file 631 is displayed as normal pages. Therefore, the normal image file 631 makes it possible to confirm the number of normal sheets Sh printed and delivered by the image forming device 2 and the date and time when they were inspected and thus it can be used as solid evidence which indicates that normal sheets Sh were delivered.

In addition, the normal image file 631 and abnormal image file 632 can be stored separately. The normal image file 631 itself can be submitted to the client as evidence of finally delivered goods. On the other hand, the abnormal image file 632 can be kept by the printing company which manages the image forming device 2, as a record of abnormal images which occurred during formation of images by the image forming device 2.

It is expected that the file size or number of pages of the normal image file 631 will be very large. For this reason, the setting to disable the creation of a normal image file 631 can be selected. Conversely, if only the normal image file 631 is used, the setting to disable the creation of an abnormal image file 632 may be selected.

In the description of the above embodiments, an example of control to enable or disable the creation of image files for the current job and next job has been taken. In addition, whether to enable or disable the creation of image files can also be controlled for jobs which are not executed successively.

The user may want to know the cause of abnormality immediately, but it may take time to create an abnormal image file 632. In order to meet this need, the file creator 605 may create text data which includes the page number or coordinates, etc. indicating the position of abnormality, as an abnormal image file 632. By doing so, the user can know the cause of abnormality immediately.

Next, how the image forming system 1 according to one or more embodiments of the present invention performs processing will be described. In the image forming system 1 according to one of more embodiments, the file to be created is changed depending on whether or not the image forming device 2 performs the recovery process.

Usually, the number of pages of normal sheets Sh is much larger than the number of pages of abnormal sheets Sh. Therefore, the time for the file creator 605 to create a normal image file 631 tends to be longer than the time to create an abnormal image file 632. In addition, if the user does not need evidence, the user is expected to decide that a normal image file 631 is not needed. Thus, the user can independently select whether to enable or disable the creation of a normal image file 631 and an abnormal image file 632.

Particularly, when the automatic recovery function of the image forming device 2 is used, the paper delivery tray 47 to which normal sheets Sh are delivered does not hold an abnormal sheet Sh. In this case, some users may store only a normal image file 631 and decide that an abnormal image file 632 is not needed.

On the other hand, when the automatic recovery function of the image forming device 2 is not used, an abnormal sheet Sh is not purged and is delivered to the paper delivery tray 48. The user may request to be able to check immediately an abnormal image file 632 as a result of analysis of the read image 603a corresponding to the abnormal sheet Sh. For this reason, it may be necessary to create only an abnormal image file 632 without creating a normal image file 631 which requires long processing time. Therefore, in the image forming system 1 according to one or more embodiments, the image file to be created by the file creator 605 is selected according to whether the automatic recovery function is used or not.

Figure 10:
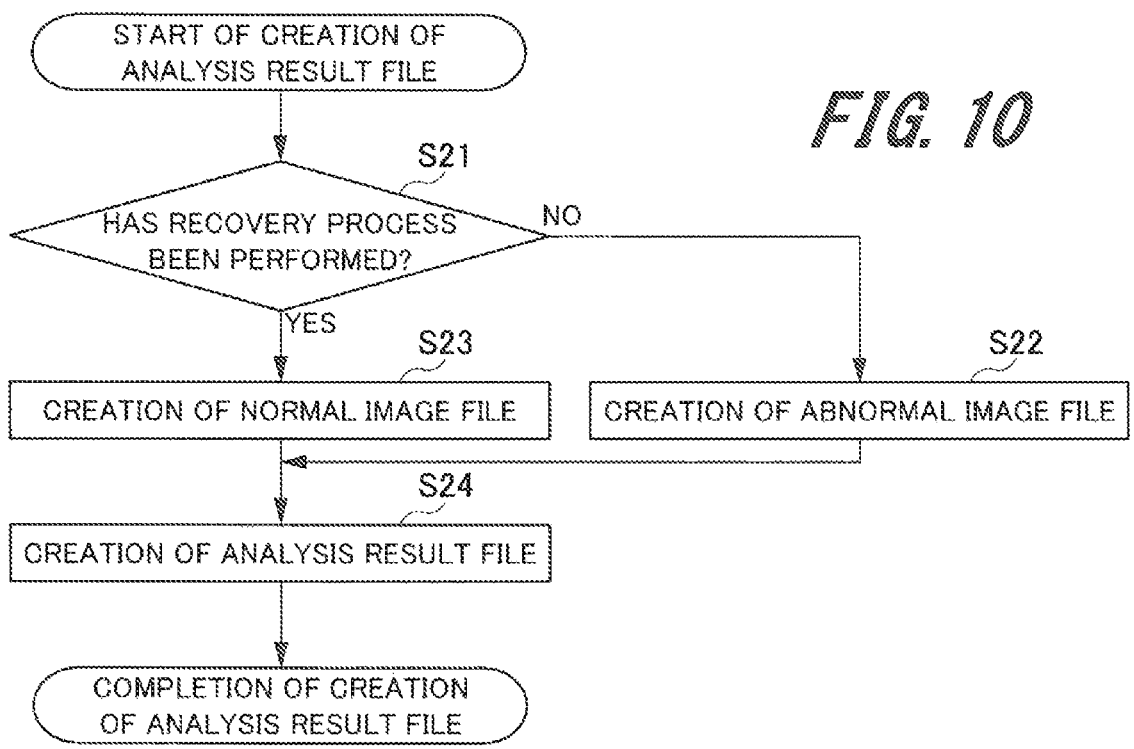
FIG. 10 is a flowchart which shows an example of the processing sequence which the file creator performs according to whether the recovery process has been performed or not, according to one or more embodiments of the present invention.

FIG. 10 is a flowchart which shows an example of the processing sequence which the file creator 605 performs according to whether the recovery process has been performed or not.

First, the file creator 605 decides whether or not the image forming device 2 has performed the recovery process (S21). If the recovery process has not been performed (NO at S21), the file creator 605 creates an abnormal image file 632 (S22), creates an analysis result file 633 (S24) and ends this sequence. In other words, when the recovery process is not performed, the file creator 605 creates an abnormal image file 632 from a read image 603a detected as abnormal, in preference to a normal image file 631 or creates only an abnormal image file 632 from a read image 603a detected as abnormal.

On the other hand, if the recovery process has been performed (YES at S21), the file creator 605 creates a normal image file 631 (S23), creates an analysis result file 633 (S24) and ends this sequence. In other words, when the recovery process is performed, the file creator 605 does not create an abnormal image file 632 from a read image 603a detected as abnormal.

In the above image forming system 1 according to one or more embodiments, a normal image file 631 is created when the recovery process is performed. Therefore, the analysis result file 633 only contains the normal image file 631. On the other hand, when the recovery process is not performed, an abnormal image file 632 is created. Therefore, the analysis result file 633 contains the abnormal image file 632. The type of image file which is created by the file creator 605 can be thus changed according to whether the automatic recovery function is used or not. Consequently, only the image file that the user requests can be created.

Next, how the image forming system 1 according to one or more embodiments of the present invention performs processing will be described.

For example, while the image inspection device 3 creates an image file according to the read image 603a of a sheet Sh with the image formed by execution of the current job, the image forming device 2 can execute the next job. Basically, after an image file for the current job is created, an image file for the next job is created.

Here, it is assumed that the read image analyzer 604 has analyzed the read image 603a of the sheet Sh with the image formed by execution of the next job and consequently has detected an abnormality. In this case, the user may request quick acquisition of an abnormal image file 632 created from the read image 603a detected as abnormal to know in which page the abnormality has been detected. When the read image analyzer 604 detects an abnormality in the read image 603a, it sends the image forming device 2 a stop command to stop the image forming device 2 once. Then, the file creator 605 preferentially creates an abnormal image file 632 from the read image 603a.

Figure 11:
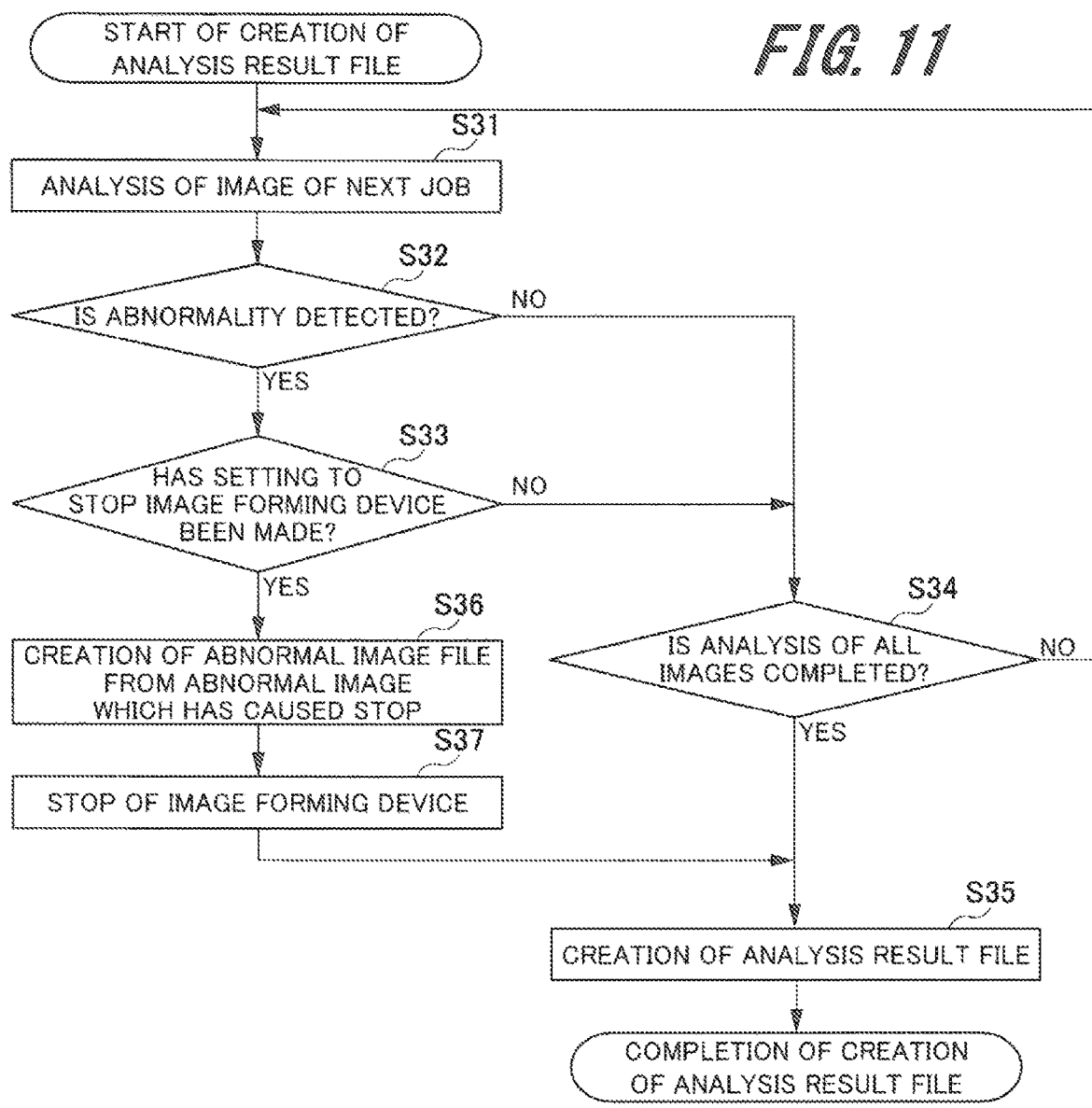
FIG. 11 is a flowchart which shows an example of the processing sequence in the case that an image file for the current job is under creation and the read image of the next job is detected as abnormal, according to one or more embodiments of the present invention.

FIG. 11 is a flowchart which shows an example of the processing sequence in the case that an image file for the current job is under creation and an abnormality is detected in the read image 603a of the next job. In this example, it is assumed that before start of the sequence in the flowchart, the read image analyzer 604 has already finished analyzing the read image 603a of the current job and the file creator 605 is creating an image file according to the read image 603a of the current job.

First, the read image analyzer 604 analyzes the read images 603a read from the RAM 603 sequentially (S31). The read images 603a which are read at this time are the images obtained by the reader 45 reading the sheets Sh on which the image forming device 2 has formed images by execution of the next job.

Next, the read image analyzer 604 decides whether or not it detects an abnormality from the read images 603a (S32). If the read image analyzer 604 does not detect an abnormality (NO at S32), the sequence goes to Step S34.

As the read image analyzer 604 detects an abnormality (YES at S32), the file creator 605 decides whether a setting to stop the image forming device 2 has been made in advance (S33). This decision is made by the read image analyzer 604 reading a value set in the parameters 603d.

If the setting to stop the image forming device 2 has been made (YES at S33), the file creator 605 creates an abnormal image file 632 according to the read image 603a of the next job which has caused the image forming device 2 to stop (S36). Then, the image forming device 2 is once stopped according to a stop command sent from the read image analyzer 604 (S37). After that, the file creator 605 creates an analysis result file 633 using the abnormal image file 632 created at Step S36 (S35). Therefore, the user can immediately know the content of abnormality, etc. using the analysis result file 633 containing the content of the abnormal image file 632 created according to the read images 603a of the next job.

On the other hand, if the read image analyzer 604 does not detect an abnormality (NO at S32) or if the setting to stop the image forming device 2 has not been made (NO at S33), the read image analyzer 604 decides whether or not analysis of all the read images 603a is completed (S34). If analysis of all the read images 603a is not completed (NO at S34), the sequence goes back to Step S31 and the read image analyzer 604 analyzes the images of the next job. On the other hand, if analysis of all the read images 603a is completed (YES at S34), the file creator 605 creates an analysis result file 633 (S35) and then the inspection by the image inspection device 3 is completed.

In the image forming system 1 according to embodiments described above, when the read image analyzer 604 detects an abnormality from the read images 603a of the next job, the image forming device 2 is once stopped. This prevents the image forming device 2 from delivering abnormal sheets Sh continuously and enables the user to address a cause of the abnormality in the image forming device 2 promptly.

The file creator 605 performs the process to create an abnormal image file 632 for the read image 603a of the next job containing an abnormality which has caused the stop, as early as possible. Then, the file creator 605 creates an analysis result file 633 containing the content of the abnormal image file 632 and supplies it to the user. Therefore, the user can grasp the content of an abnormality in an image which is formed on a sheet Sh by the image forming device 2 through execution of the next job, and address a cause of the abnormality promptly.

Next, an example of the configuration of the image forming system according to one or more embodiments of the present invention will be described. In the image forming system according to one or more embodiments, the image forming device creates an image file from a read image according to the analysis result received from an image inspection device.

Figure 12:
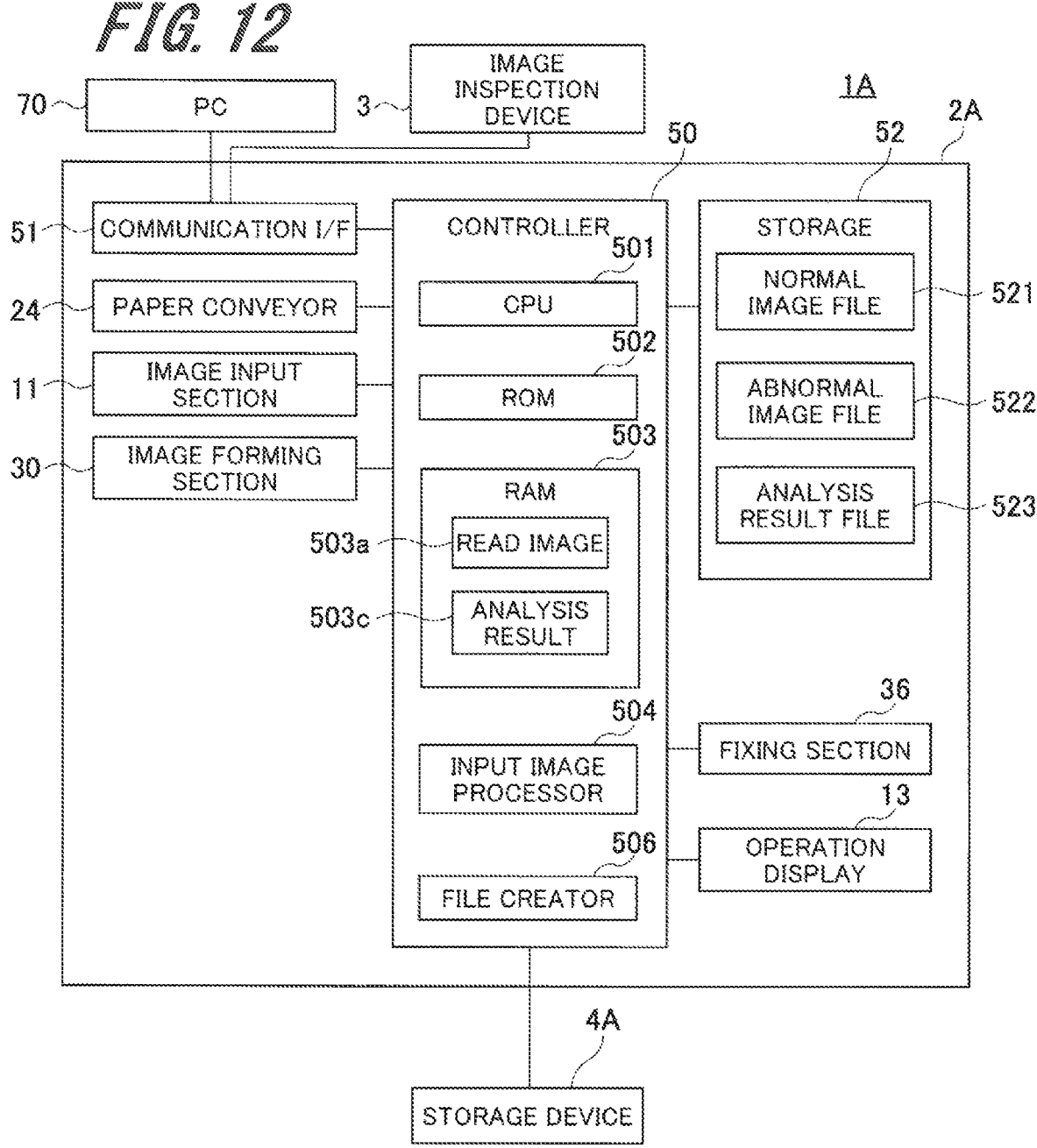
FIG. 12 is a functional block diagram which shows an example of the configuration of the image forming system according to one or more embodiments of the present invention.

FIG. 12 is a functional block diagram which shows an example of the configuration of an image forming system 1A.

The image forming system 1A includes an image forming device 2A, the image inspection device 3, and the PC 70.

The controller 50 includes a file creator 506 in addition to the CPU 501, ROM 502, RAM 503, and input image processor 504 which are shown in FIG. 2. The function of the file creator 506 is the same as that of the file creator 605 shown in FIG. 3.

The CPU 501 of the controller 50 stores the read image 603a received from the image inspection device 3 through the communication I/F 51, in the RAM 503 as a read image 503a. The read image 503a is data which is sent from the image inspection device 3 each time the reader 45 of the image inspection device 3 reads an image formed on a sheet Sh. The CPU 501 also stores the analysis result 603c received from the image inspection device 3 through the communication I/F 51, in the RAM 503 as an analysis result 503c.

The file creator 506 creates a normal image file 521, an abnormal image file 522, and an analysis result file 523 according to the analysis result 503c read from the RAM 503 and the read image 503a, and stores them in the storage 52 or a storage device 4A connected to the controller 50, such as an HDD. The contents of these image files are shown on the operation display 13 or the display of the PC 70. In other words, the operation display 13 or the display of the PC 70 shows the file list screen W1 as shown in FIG. 6, the analysis result report R1 as shown in FIG. 7, the abnormal pages as shown in FIG. 8, and the normal pages as shown in FIG. 9.

In the image forming system 1A according to one or more embodiments, the normal image file 521, abnormal image file 522, and analysis result file 523 are created in the same manner as in the image forming systems 1 according to the above embodiments. Thus, the user can check whether the image formed on the sheet Sh is abnormal or not, according to the content of the screen, report or the like shown on the operation display 13. In addition, the user can use the normal image file 631 as evidence to confirm when and how correctly normal pages were printed.

Next, an example of the configuration of the image forming system according to one or more embodiments of the present invention will be described. The configuration of the image forming system according to one or more embodiments is the same as that of the image forming system 1 shown in FIG. 2 except that the image inspection device 3 is removed. Therefore, the image forming system according to one or more embodiments includes the same main processing sections as those of the controller 60 of the image inspection device 3 in the above embodiments.

Figure 13:
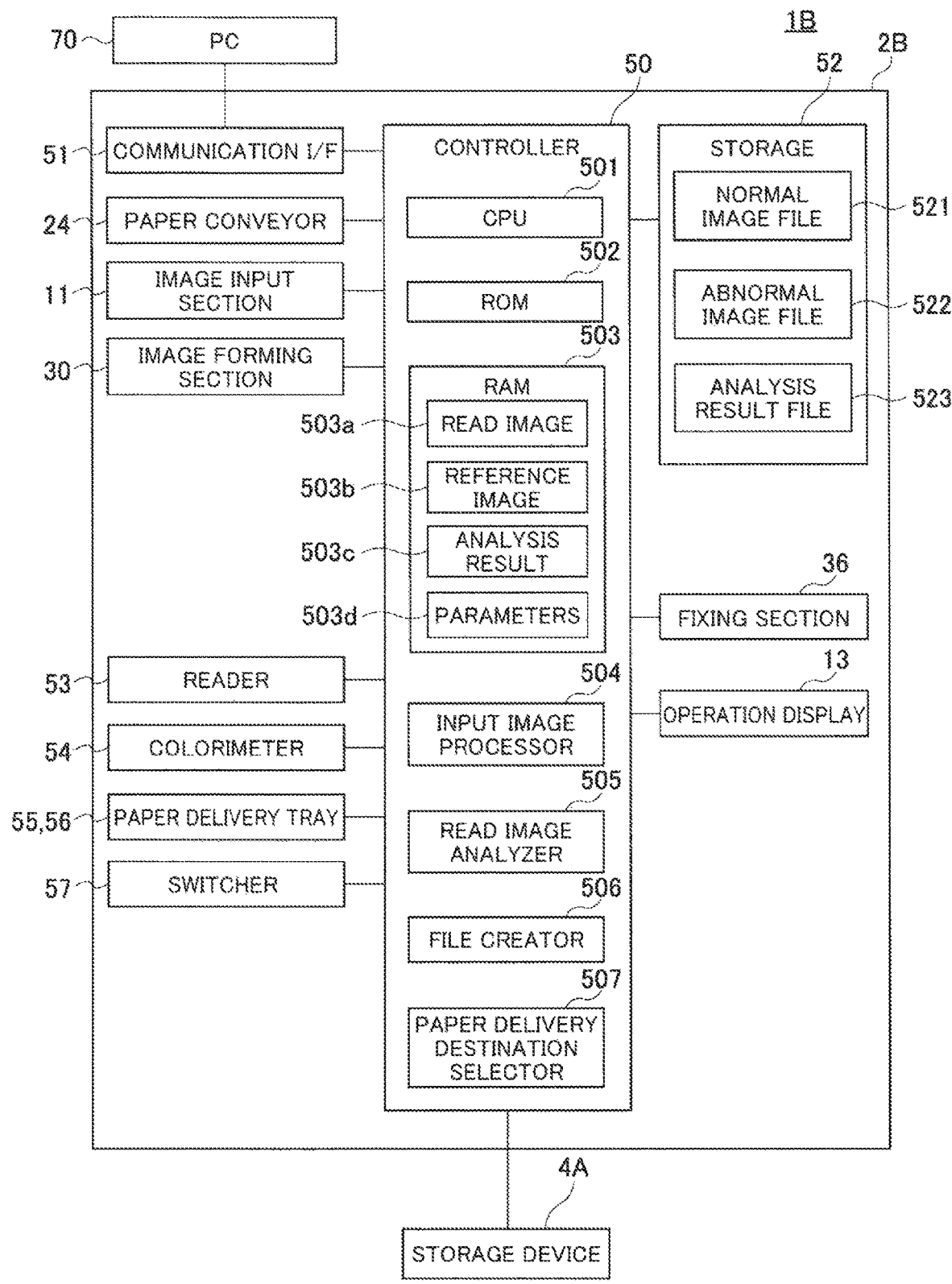
FIG. 13 is a functional block diagram which shows an example of the configuration of the image forming system according to one or more embodiments of the present invention.

FIG. 13 is a functional block diagram which shows an example of the configuration of an image forming system 1B.

The image forming system 1B includes an image forming device 2B, the storage device 4A, and the PC 70.

The controller 50 includes a read image analyzer 505 and a paper delivery destination selector 507 in addition to the CPU 501, ROM 502, RAM 503, input image processor 504, and file creator 506 which are shown in FIG. 12. The functions of the read image analyzer 505 and paper delivery destination selector 507 are the same as the read image analyzer 604 and paper delivery destination selector 606 which are shown in FIG. 3.

The RAM 503 stores not only the read image 503a and analysis result 503c but also a reference image 503b and parameters 503d which are the same data as the reference image 603b and parameters 603d in the image inspection device 3. In one or more embodiments, the read image 503a which is stored in the RAM 503 is an image read by a reader 53 and the analysis result 503c is data obtained by the read image analyzer 505 analyzing the read image 503a.

The parameters 503d are various values set by the controller 50. The read image analyzer 505, file creator 506, and paper delivery destination selector 507 perform processing according to the above embodiments according to the set values read from the parameters 503d.

The read image analyzer 505 compares the read image 503a read from the RAM 503 with the reference image 503b and analyzes whether the read image 503a is normal or abnormal. The result of analysis by the read image analyzer 505 is stored in the RAM 503 as an analysis result 503c.

The paper delivery destination selector 507 gives a command to select either a paper delivery tray 55 or a paper delivery tray 56 as the destination to which the sheet Sh conveyed according to the analysis result 503c from the read image analyzer 505. If the analysis result 503c indicates that the image formed on the sheet Sh is normal, the paper delivery destination selector 507 activates the switcher 57 and delivers the normal sheet Sh to the paper delivery tray 55. On the other hand, if the analysis result 503c indicates that the image formed on the sheet Sh is abnormal, the paper delivery destination selector 507 activates the switcher 57 and delivers the abnormal sheet Sh to the paper delivery tray 56. Thus, according to the command from the paper delivery destination selector 507, the switcher 57 changes the paper delivery destination for a normal sheet Sh and an abnormal sheet Sh.

The image forming device 2B further includes the reader 53, a colorimeter 54, the paper delivery trays 55 and 56, and the switcher 57. The reader 53, colorimeter 54, paper delivery trays 55 and 56, and switcher 57 have the same functions as the reader 45, colorimeter 46, paper delivery trays 47 and 48, and switcher 44 of the image inspection device 3 according to the above embodiments, respectively.

The reader 53 and colorimeter 54 are located along the conveying path 21 downstream of the fixing section 36.

The reader 53 is an example of an image input device such as an image sensor and sends the read images obtained by reading the sheet Sh with images formed, from above and under the conveying path 21, to the controller 50. The CPU 501 of the controller 50 stores the read images in the RAM 503 as read images 503a.

The colorimeter 54 measures the color density of an image formed on a sheet Sh.

In the image forming system 1B according to one or more embodiments, the normal image file 521, abnormal image file 522, and analysis result file 523 are created in the same manner as in the above image forming systems 1 and 1A. The user can check whether the image formed on the sheet Sh is normal or abnormal, according to the content of the screen, report or the like shown on the operation display 13 and confirm how correctly normal pages were printed, with evidence.

The present invention is not limited to the above embodiments. Obviously, the invention may be embodied and applied in other various ways without departing from the gist of the present invention as described in the appended claims.

In the above embodiments, the device and system configurations have been described in detail and concretely for easy understanding of the present invention; however, the present invention is not limited to a structure which includes all the elements described above. An element of one embodiment may be replaced by an element of another embodiment or an element of one embodiment may be added to another embodiment. For each embodiment, addition, deletion, or replacement of an element can be made.

The control lines and data lines shown herein are those considered as required for explanation and do not cover all the control lines and data lines in the product. It may be considered that almost all constituent elements are actually connected to each other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . image forming system,
2 . . . image forming device,
3 . . . image inspection device,
4 . . . storage device,
10 . . . printer,
13 . . . operation display,
30 . . . image forming section,
36 . . . fixing section,
50 . . . controller,
503a . . . read image,
503b . . . reference image,
503c . . . analysis result,
503d . . . parameters,
504 . . . input image processor,
505 . . . read image analyzer,
506 . . . file creator,
507 . . . paper delivery destination selector

What is claimed is:

1. An image inspection device comprising:
a processor coupled to a sensor and that:
reads an image formed on a recording material by an image forming device and creates a read image;
causes an analysis to detect an abnormality in the read image and creates an analysis result; and
creates a normal image file that is transmitted via a communication interface and that includes the read image in which the abnormality has not been detected based on the analysis result, wherein
the processor further:
creates an abnormal image file including the read image in which the abnormality has been detected,
creates the abnormal image file of a current job in preference to the normal image file of the current job, and
creates the abnormal image file of another job that is executed after the current job in preference to the normal image file of the current job.

2. The image inspection device according to claim 1, wherein the processor further:
sends a stop command to the image forming device when the abnormality is detected in the read image of the current job, and
preferentially creates the abnormal image file from the read image.

3. The image inspection device according to claim 1, wherein if the processor causes a recovery process to make the image forming device re-form the image that corresponds to the read image in which the abnormality has been detected, the processor does not create the abnormal image file.

4. The image inspection device according to claim 1, wherein if the processor does not cause a recovery process to make the image forming device re-form the image that corresponds to the read image in which the abnormality has been detected, the processor:
creates the abnormal image file in preference to the normal image file; or
creates only the abnormal image file.

5. The image inspection device according to claim 1, wherein the processor creates the normal image file for: every job executed by the image forming, a collated set, a prescribed number of pages, or a prescribed file size.

6. The image inspection device according to claim 1, wherein
the processor creates, separately from the normal image file, an abnormal image file based on the analysis result,
the normal image file is composed of a normal image in which the abnormality has not been detected, and indicates that the normal image of a correct number of page has been produced, and
the abnormal image file is composed of an abnormal image in which the abnormality has been detected, and shows a page number of the abnormal image or a portion of the abnormal image in which the abnormality has occurred.

7. The image inspection device according to claim 6, wherein
the processor creates an analysis result file that contains the normal image file and the abnormal image file, and
the abnormal image is put in a first page of the analysis result file, and the normal image is put in a subsequent page to the first page.

8. An image inspection device comprising:
a processor coupled to a sensor and that:
reads an image formed on a recording material by an image forming device and creates a read image;
causes an analysis to detect an abnormality in the read image and creates an analysis result; and
creates a normal image file that is transmitted via a communication interface and that includes the read image in which the abnormality has not been detected based on the analysis result, wherein
the processor further:
creates an abnormal image file including the read image in which the abnormality has been detected,
creates the abnormal image file of a current job in preference to the normal image file of the current job, and
when the abnormality is detected in the read image of another job that is executed after the current job, stops a process to create the normal image file of the current job and preferentially creates the abnormal image file of the another job.

9. A non-transitory computer-readable recording medium storing a program causing a computer to perform:
reading an image formed on a recording material by an image forming device and creating a read image;
causing an analysis to detect an abnormality in the read image and creating an analysis result;
creating a normal image file that is transmitted via a communication interface and that includes the read image in which the abnormality has not been detected based on the analysis result;
creating an abnormal image file including the read image in which the abnormality has been detected;
creating the abnormal image file of a current job in preference to the normal image file of the current job; and
creating the abnormal image file of another job that is executed after the current job in preference to the normal image file of the current job.

10. An image forming device comprising:
a processor coupled to a sensor and that:
causes an image forming section to form an image on a recording material;
reads the image formed on the recording material and creates a read image;
causes an analysis to detect an abnormality in the read image and creates an analysis result;
creates a normal image file that is transmitted via a communication interface and that includes the read image in which the abnormality has not been detected based on the analysis result;

creates an abnormal image file including the read image in which the abnormality has been detected;

creates the abnormal image file of a current job in preference to the normal image file of the current job; and creates the abnormal image file of another job that is executed after the current job in preference to the normal image file of the current job.

11. An image forming device comprising:

a processor that:

causes an image forming section to form an image on a recording material; and creates a normal image file that is transmitted via a communication interface and that includes a read image in which an abnormality has not been detected based on an analysis result received from an image inspection device, wherein the image inspection device comprises a processor coupled to a sensor, the processor of the image inspection device:

reads the image formed on the recording material and creates the read image;

causes an analysis to detect the abnormality in the read image to create an analysis result; and sends the analysis result and the read image to the image forming device, and the processor of the image forming device:

creates an abnormal image file including the read image in which the abnormality has been detected;

creates the abnormal image file of a current job in preference to the normal image file of the current job; and creates the abnormal image file of another job that is executed after the current job in preference to the normal image file of the current job.

\* \* \* \* \*